United States Patent [19]

Badino

[11] 4,169,794
[45] Oct. 2, 1979

[54] FILTER

[75] Inventor: Charles L. Badino, Mexico, Mo.

[73] Assignee: Joy Manufacturing Company, Pittsburgh, Pa.

[21] Appl. No.: 773,583

[22] Filed: Mar. 2, 1977

[51] Int. Cl.² ............................................. B01D 33/26
[52] U.S. Cl. ...................... 210/330; 210/347
[58] Field of Search ............... 210/232, 234, 330, 331, 210/486, 487, 347

[56] References Cited

U.S. PATENT DOCUMENTS

| 2,406,065 | 8/1946 | Dickinson et al. | 210/95 |
|---|---|---|---|
| 2,464,223 | 3/1949 | Genter | 210/331 |
| 2,864,503 | 12/1958 | Hunter | 210/93 |
| 2,876,905 | 3/1959 | Daman | 210/298 |
| 2,932,402 | 4/1960 | Logue et al. | 210/383 |
| 3,168,470 | 2/1965 | Rhoda | 210/239 |
| 3,193,105 | 7/1965 | Putnam | 210/331 |
| 3,452,874 | 7/1969 | Keller et al. | 210/331 |
| 3,471,027 | 10/1969 | Emilsson | 210/331 |
| 3,659,716 | 5/1972 | Peterson et al. | 210/247 |
| 3,960,729 | 6/1976 | Peterson et al. | 210/331 X |
| 4,075,103 | 2/1978 | Kane | 210/331 |

OTHER PUBLICATIONS

Chemical Engineers Handbook, 4th edition, by Perry et al. McGraw-Hill Book Co. New York, pp. 64 and 65, 1963.

*Primary Examiner*—John Adee
*Attorney, Agent, or Firm*—J. Stewart Brams

[57] ABSTRACT

A rotary filtering apparatus having improved filtrate flow conducting means.

6 Claims, 6 Drawing Figures

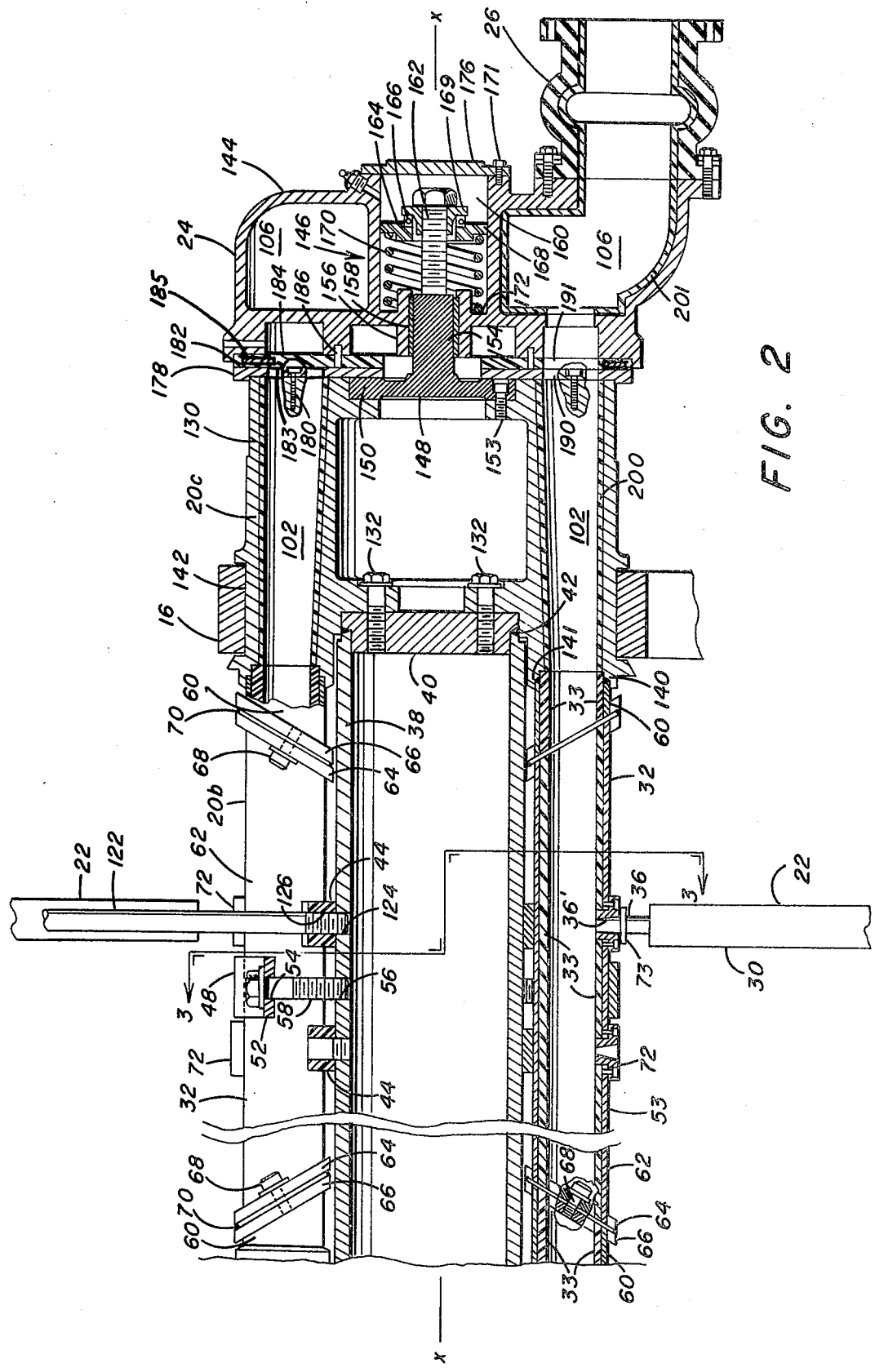

FILTER

This invention pertains generally to rotary filtering apparatus such as rotary disc or leaf filters of the type commonly used in industry for dewatering slurries or pulp. For example, in the mining industry, rotary disc filters are often used to dewater slurried material after hydraulic transporting or flotation processing thereof to recover the mineral solids therefrom Such disc filters generally have included a plurality of coaxially arranged filter discs which are rotatably supported by an elongated rotary shaft upwardly adjacent an open tank containing the material to be dewatered such that a lower portion of each filter disc is immersed in the contained material. A suitable vacuum pump means communicates via a network of flow passages formed within the rotary shaft with the filter discs to provide a suction within immersed portions of each disc to draw the liquid component or filtrate out of the slurried material through an expanse of filter medium covering the filter disc frame. The solid component is thus deposited in the form of a solids cake on the exterior of the immersed disc portion. By powered rotation of the shaft the immersed disc portions are rotated out of the contained material for drying by continued vacuum action or other suitable means to remove residual water followed by removal of the cake from the discs by scraping or by backblowing air through the filter medium. Through continuing rotation the cleansed disc portions are subsequently re-immersed in the slurried material and the filtering cycle is repeated to provide the well known continuous dewatering or solids recovery process.

Although prior rotary disc filters have generally served their intended purposes, they have nevertheless often been subject to troublesome deficiencies. For example, in prior filters the main rotary shaft has often included filtrate flow passages extending axially therewithin and often formed integrally therewith, for example as in U.S. Pat. Nos. 2,932,402 and 3,659,716. Repair and maintenance of individual filtrate passages in such filters had been extremely difficult if not impossible. Also, prior filters have often been subject to persistent filtrate passage wall erosion problems due to high filtrate flow velocities in the passages and abrasion of the passage walls by residual solid particles entrained in the filtrate flow. This had led to premature passage failure thus further complicating filter repair and maitenance.

Another deficiency of prior disc filters has been abrasion between slidably engaged surfaces such as the wear surfaces at the interface of the rotary shaft trunnion with the stationary trunnion valve as U.S. Pat. No. 3,452,874, for example. Such abrasion may cause excess wear of the interfaced surfaces and result in premature loss of the necessary seal therebetween. Furthermore, residual particles may lodge between the relatively sliding surfaces thus aggravating abrasion and wear problems.

The present invention alleviates these and other deficiencies of prior disc filters by providing improved main shaft filtrate flow passageway means including individually removable and replaceable filtrate conduits or tubes with replaceable, abrasion resisting tube liners therein. The invention also provides improved trunnion and valve construction including replaceable, abrasion resisting trunnion and valve wear members and improved means for directing filtrate flow from the individual filter sectors into the filtrate tubes.

Accordingly, one object of this invention is to provide improved flow conducting means for a rotary filtering apparatus.

Another object of this invention is to provide a rotary disc filter with filtrate flow conducting means including anti-abrasion means therein.

A further object of this invention is to provide easily replaceable anti-abrasion means in a rotary disc filter flow conducting means.

Yet another object of this invention is to provide individually removable and serviceable filtrate flow conduits or tubes for a rotary disc filter.

Still another object of this invention is to provide a rotary disc filter with improved means for directing filtrate flow between relatively movable flow conducting elements thereof.

A more specific object of the invention is to provide improved face seal means for directing filtrate flow between relatively rotating flow conducting elements in a rotary disc filter.

An additional object of the invention is to provide improved connector means for connecting individual filter sectors in a disc filter in liquid conducting relation with the respective filtrate flow conduits or tubes.

These and other objects of the invention are more fully specified in the following description with reference to the accompanying drawings in which:

FIG. 2 is a fragmentary portion of FIG. 1 showing a partial central longitudinal section of the main rotary shaft of the filter of FIG. 1 taken on line II—II of FIG. 3 and including fragmentary portions of the filter discs affixed thereto;

Figure 1:
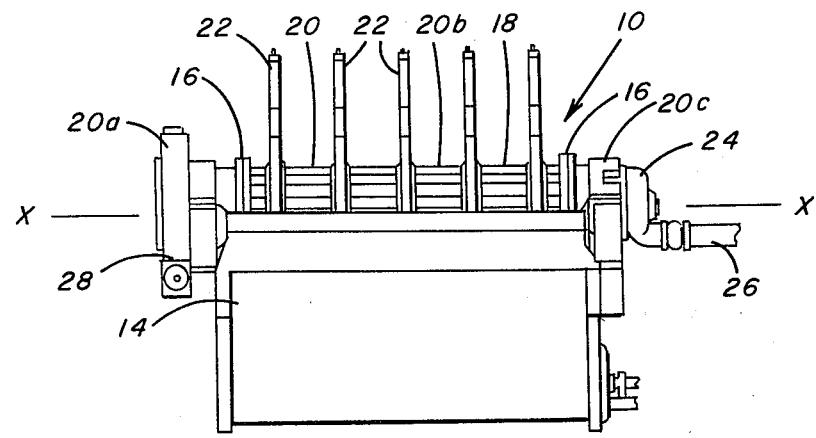
FIG. 1 is a side elevation of a rotary disc filter apparatus according to one embodiment of the instant invention.

There is generally indicated at 10 in FIG. 1 a rotary disc filter apparatus constructed according to one embodiment of the instant invention and comprising a rigid, upwardly open tank 14 adapted to contain a volume of material to be dewatered such as pulp or slurried mineral ore. Suitable anti-friction bearing means 16 are rigidly carried by tank 14 at laterally spaced locations adjacent an upper portion thereof to rotatably support an elongated, rigid filter disc assembly 18 on a horizontal axis of rotation X—X. Assembly 18 includes an elongated main shaft assembly 20 supported adjacent its axial ends by the bearings 16 for rotation about axis X—X, and a plurality of generally circular filter discs 22 secured coaxially and nonrotatably with respect to shaft assembly 20 at axially spaced locations therealong such that a lower portion of each disc 22 is immersed in the slurry contained within tank 14.

Shaft assembly 20 comprises an elongated central portion 20b having a pair of end or trunnion portions 20a, 20c suitable rigidly affixed coaxially adjacent the respective opposed longitudinal ends thereof. At least one of the trunnion portions, shown as portion 20c, communicates in selective fluid flow conducting relation with a trunnion valve means 24 for controlling the filtering process in a known manner by selectively connecting interior portions of filter discs 22 to a source of applied suction or partial vacuum such as a suitable vacuum pump means (not shown) which communicates with valve 24 via a conduit 26. Also, at least one of the trunnion portions, shown as portion 20a, includes a suitable rotary drive means, a conventional powered worm gear drive 28 for example, to drive filter assembly 18 in axial rotation.

Each filter disc 22 is assembled from a plurality of generally flat, hollow filter sectors 30 (FIG. 3) disposed circumferentially of shaft portion 20b, and extending radially outwardly therefrom, each of which sectors 30 comprises a generally planar, rigid frame (not shown) of any suitable structural material, molded polyurethane for example, which is encompassed by an expanse of suitable filter medium 34. Within the hollow interior (not shown) of each sector 30 well known filtrate flow conducting channels communicate in fluid flow conducting relation via a radially inward sector neck portion 36 with one of a respective plurality of axially extending filtrate tube assemblies 32 which are carried by shaft assembly 20 in a manner to be described hereinbelow. In turn, the tube assemblies 32 communicate in fluid flow conducting relation with valve 24 in a manner to be described hereinbelow such that the liquid constituent of the slurry adjacent an immersed sector 30 may be drawn through filter medium 34 under the impetus of the hereinabove mentioned applied suction thus depositing the solid slurry component on the filter medium 34 for subsequent collection by scraping or by back blowing air through the filter medium in the well known manner.

Figure 6:
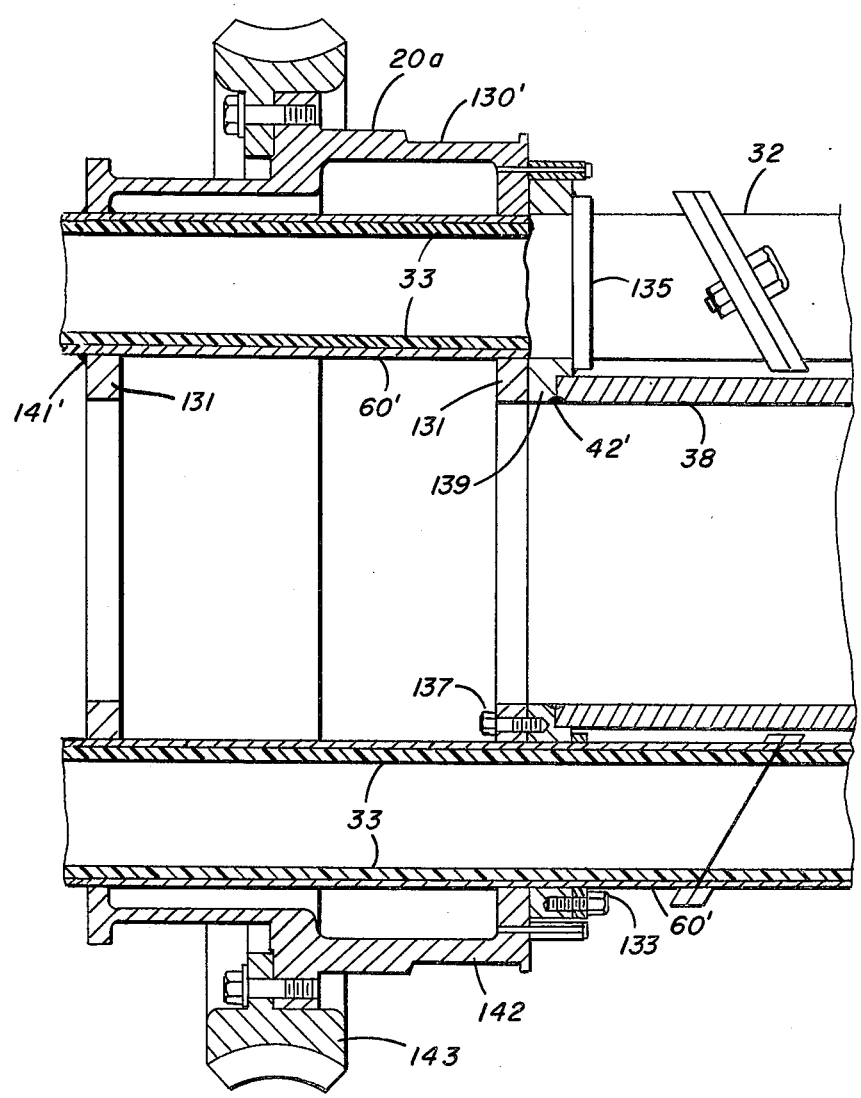
FIG. 6 is a partial central longitudinal section similar to FIG. 2 showing a fragmentary portion of the main rotary shaft drive trunnion end portion.

For purposes of clarity in the description hereinbelow, the axial directions toward shaft central position 20b from either extreme end of axis X—X will be referred to as the axially inward directions and the opposite directions as the axially outward directions. Also, for purposes of this description, shaft assembly 20 is shown in FIG. 2 with the left or drive trunnion end portion 20a omitted inasmuch as the description hereinbelow of the right or valve trunnion end portion 20c and the axially inwardly adjacent parts of central shaft portion 20b applies also to the unillustrated left trunnion portion 20a except as noted. Likewise an alternative trunnion construction, shown in FIG. 6 as applied to drive trunnion 20a, applies also to valve trunnion 20c.

Central shaft portion 20b (FIGS. 2 and 3) comprises an elongated, rigid, tubular support member 38 such as a length of steel pipe having an end cap 40 rigidly affixed coaxially adjacent each longitudinal end thereof as by circumferential weldments 42. One or more generally circular hub rings 44 formed of any material suitable for load bearing, molded polyurethane or steel for example, snuggly encompass member 38 at selected axial locations therealong, each ring 44 including a plurality of circumferentially spaced, radially outwardly facing, formed saddle portions 46 (FIG. 3) which support respective ones of filtrate tube assemblies 32 therein. Assemblies 32 are releasably retained within saddle portions 46 by plural clamp means 48 disposed circumferentially intermediate adjacent pairs of tube assemblies 32. Each clamp 48 comprises a rigid, elongated bar 49 including a pair of generally angular, formed end portions 50 and a bridge portion 52 extending therebetween. In assembly, clamp end portions 50 engage the radially outer wall 53 of a pair of adjacent tube assemblies 32 and bridge portion 52 extends therebetween such that a through bore 54 formed centrally of bridge 52 is radially aligned with a radially extending threaded bore 56 in member 38. A bolt 58 is passed radially inwardly through bore 54, threadedly engaged within the respective bore 56 and drawn tight to bias bar 49 radially inwardly thereby securely clamping the adjacent tube assemblies 32 in the respective saddle portions 46. Hub rings 44 and clamps 48 may be positioned as deemed desirable along the axial length of member 38. For example, in one preferred arrangement rings 44 are located in the planes of the respective discs 22 (FIG. 2) with clamps 48 adjacent thereto for maximum support of the tube assemblies 32 at these high load points.

Each tube assembly 32 (FIG. 2) comprises a pair of axially aligned tube end portions 60 extending adjacent the axially inner end of the respective trunnion end portions 20a, 20c and rigidly affixed thereto in such a manner and for the purposes described hereinbelow, and an elongated intermediate tube portion 62 which extends axially intermediate each aligned pair of tube ends 60 and is sealingly, releasably affixed thereto as by plural threaded fasteners 68 securing together respective pairs of end flange portions 64, 66 of the tube portions 62, 60. A suitable sealing gasket 70 may be used for improved sealing between the respective pairs of flanges 64, 66. Preferably, the two flange pairs 64, 66 of each assembly 32 lie in planes which diverge radially outwardly from axis X—X such that the axial dimension between the opposed longitudinal ends of each tube 62 is smaller adjacent a radially inner extent thereof than adjacent a radially outer extent thereof. Accordingly, removal and replacement of intermediate tube portions 62 is greatly facilitated in that upon removing fasteners 68 and lifting the intermediate tube portion 62 radially outwardly away from end portions 60, the respective adjacent flanges 64, 66 separate immediately without relative sliding movement therebetween. The criticality of physical clearance and manufacturing tolerance considerations is thus minimized and assembly of the tube joints, including insertion of gaskets 70, is correspondingly simplified.

Figure 3:
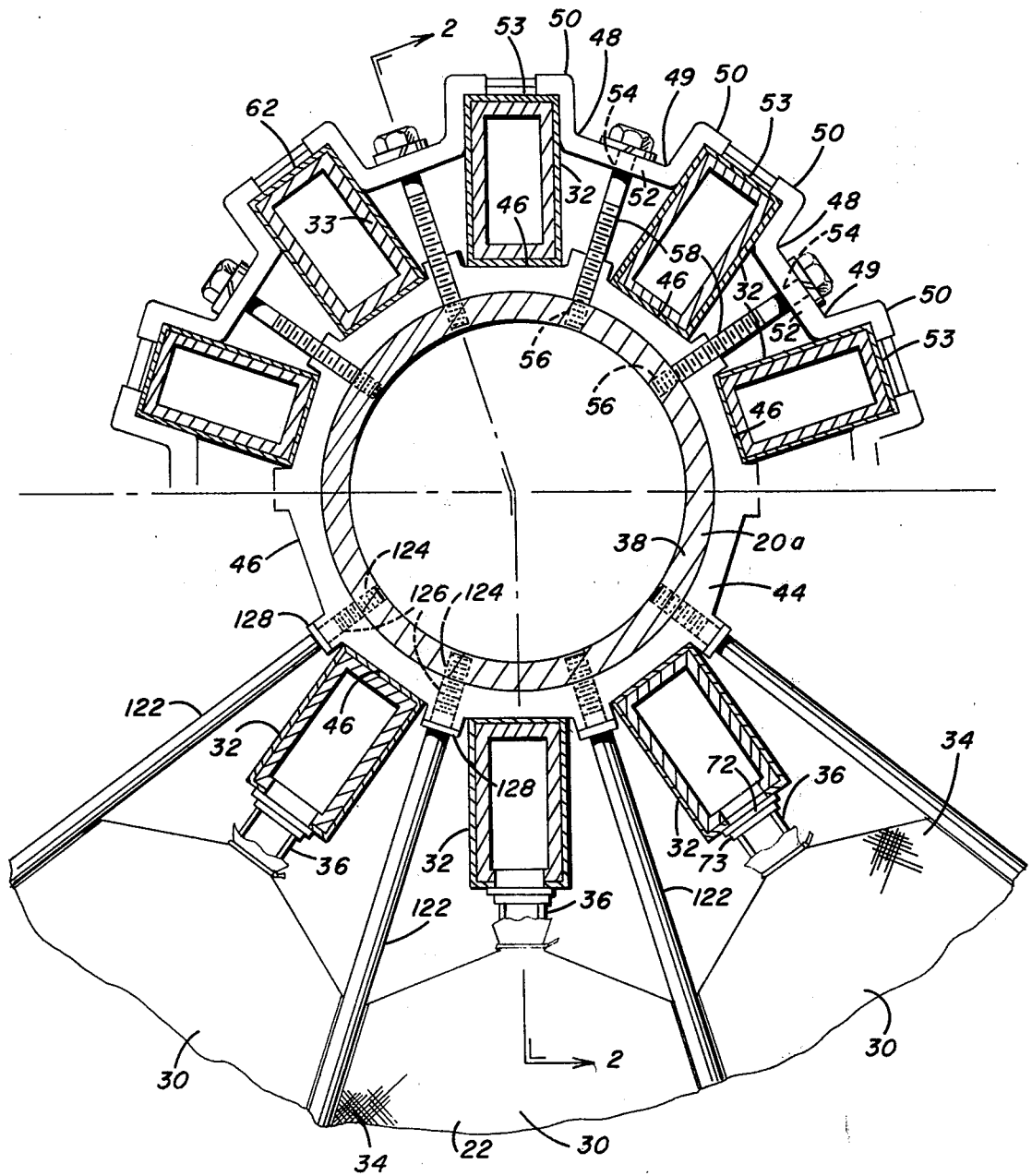
FIG. 3 is a transverse section of FIG. 2 taken on line III—III of FIG. 2.

Of course, the tube portions 60, 62 may be of any suitable cross sectional configuration; however, they are preferably fabricated from a generally square or rectangular standard mill stock steel tubing (FIG. 3).

The tube portions 60, 62 are lined with removable tube liners 33 of suitable abrasion or wear resisting material such as molded polyurethane. Liners 33 are cooperably formed and sized to be slidably fitted within tube portions 60, 62 and substantially coextensive therewith for captive retention therewithin when the tube portions 60, 62 are assembled as described hereinabove. Thus upon disassembly of the tube portions 60, 62 the liners 33 become accessible for removal or replacement thereof. The abrasion resistance of liners 33 greatly enhances filtrate tube life by providing a durable inner wall surface which withstands abrasion by the high filtrate flow velocities and the impingement thereon of residual particles in the filtrate flow. Furthermore, when the liners 33 do become excessively worn after extended use, they may be quickly and easily replaced with a minimum of labor. Accordingly, filter reliability is significantly enhanced and the cost of repair and maintenance correspondingly reduced.

Figure 4:
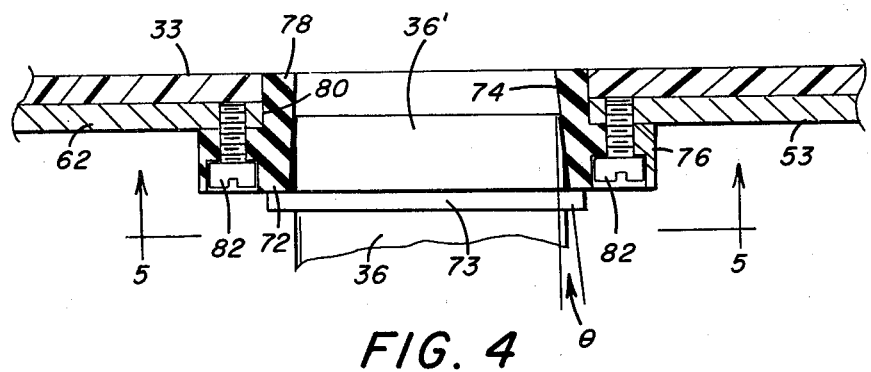
FIG. 4 is a fragmentary portion of FIG. 2 showing a transverse section of a sector seal of this invention with the neck of a filter sector received therein.

Each intermediate tube portion 62 has releasably mounted on its outer wall 53 a plurality of formed sector seals 72 (FIGS. 2, 4, and 5) of molded polyurethane, for example at axially spaced locations corresponding to the axial locations of the respective discs 22. Each seal 72 compriss a unitary seal body 78 having a tapered through opening 74 and an enlarged flange 76 surrounding opening 74 adjacent the larger or outwardly tapering end thereof. Each seal body 78 is closely received within a cooperably formed through opening 80 extending within tube wall 53 and liner 33 and is releasably, sealingly secured therein as by plural screws 82. If desired, a suitable sealing gasket (not shown) may be employed for more effective sealing between wall 53 and seal flange 76. Opening 74 narrows or tapers inwardly toward the interior of tube section 62 at a taper angle $\theta$ within the range of approximately one degree to approximately 10 degrees measured from the axis of opening 74 to sealingly receive therein a nontapered open end 36' of one filter sector neck porton 36 (FIG. 2). The taper angle $\theta$ to be used depends upon various factors including the physical properties of the materials forming the sector seal and the sector neck 36, the required sealing characteristics or degree of seal integrity therebetween, and the like. Taper angle $\theta$ is preferably in the range of approximately 2 degrees to approximately 4 degrees. The outer periphery of each open end portion 36' is formed for a continuous peripheral interference fit when engaged within opening 74 for fluid tight sealing therebetween. Preferably, the material of at least neck end 36' or seal 72, preferably both, is suitably pliable to permit limited deformation thereof for an enlarged surface area of mutual contact and improved fluid sealing therebetween.

Figure 5:
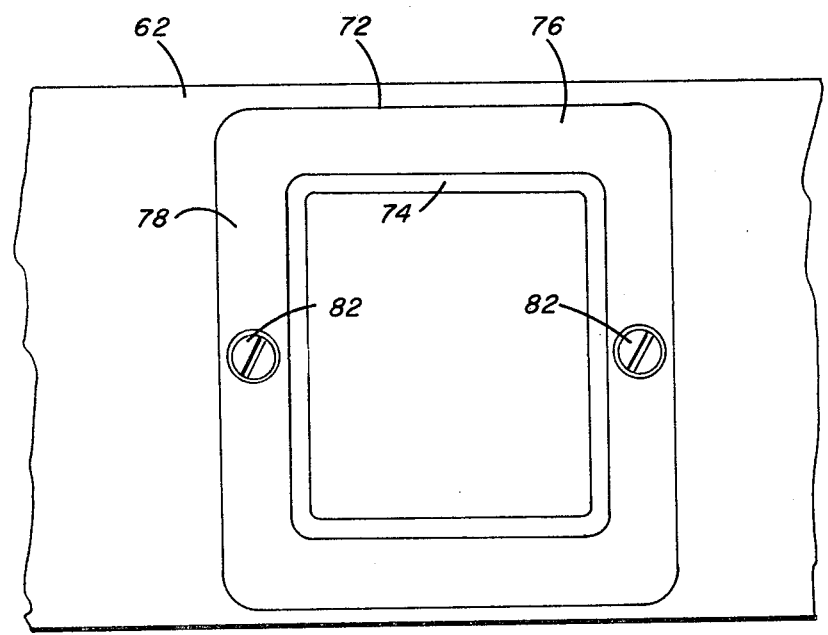
FIG. 5 is an elevation of the sector seal of FIG. 4 as viewed from line V—V of FIG. 4 and with the sector neck omitted.

Opening 74 may have any of a variety of cross sectional shapes but preferably is of a generally square or rectangular form as shown in FIG. 5, it having been found that this shape provides for maximum fluid seal integrity during minor, unavoidable movement of the filter sector 30 with respect to shaft 20, which may tend to slighly cock or tilt neck end 36' with respect to the seal 72 in which it is received. It will be appreciated that opening 74 need not be uniformly tapered at a single taper angle $\theta$. In particular, when opening 74 is formed at least partially by straight sides such as in the generally square or rectangular opening configuration, selected ones of such sides may taper at an angle different from the taper angle of other selected sides according to the requirements dictated by the desired sealing characteristics.

In assembly of the filter discs 22, plural sectors 30, ten sectors for example, are positioned in a common plane normal to axis X—X to encompass shaft portion 20b thus forming a disc 22. The respective neck portions 36 of each sector 30 extend radially inwardly into engagement within openings 74 of respective coplanar ones of sector seals 72 carried by the circumferentially spaced tube assemblies 32. An enlarged, circumferentially extending flange portion 73 of each neck 36 engages the flange 76 of each respective seal 72 for radial support of the sector 30.

A conventional, radially extending stay rod 122 is disposed intermediate each pair of circumferentially adjacent sectors 30 and supported by threaded engagement of the radially inner end thereof within a radially extending threaded bore 124 formed in member 38. According to a preferred embodiment of the invention, each rod 122 also passes through a bore 126 aligned with the respective bore 124 and formed in hub ring 44 circumferentially intermediate the adjacent saddle portions 46. A fixed flange portion 128 of each rod 122 located adjacent the radially inner end thereof exerts a radially inward bias on ring 44 consequent upon securing the stay rod within bore 124 for improved structural integrity of the assembly. Any conventional rod clamp means (not shown) cooperable with the radially outer end of each rod 122 secures the respective adjacent outer peripheral portions of the adjacent sectors 30 in the known manner whereby each sector 30 is retained by at least a three point support including the hereinabove mentioned conventional rod clamp means of two adjacent rods 122 and engagement of the sector neck portion 36 in fluid tight sealed engagement within the respective sector seal 72 as described hereinabove.

Trunnion ends 20a, 20c may each comprise a generally cylindrical, elongated trunnion body 130 (as shown for end 20c in FIG. 2) which is rigidly affixed coaxially adjacent one axial end of member 38 as by plural threaded fasteners 132 threadedly engaged within cap 40. A trunnion bearing portion 142 extends continuously circumferentially of the trunnion body 130 intermediate the axial ends thereof and is adapted for engagement by bearing 16 for rotary support of the filter assembly 18 on axis X—X as described hereinabove. Body 130 extends radially outwardly of tube member 38 to provide an annular inner axial end surface 140 from which the tube ends 60 extend at circumferentially spaced locations. Tube ends 60 are rigidly affixed to body 130 adjacent surface 140 as by continuous peripheral weldments 141 or other suitable means for a fluid tight junction therebetween, and body 130 includes a plurality of internally formed, generally axially extending flow passageways 102, each of which openly communicates adjacent surface 140 with the interior of one of the tube ends 60 for purposes to be described hereinbelow.

An alternative construction of a trunnion member (shown in FIG. 6 as drive trunnion 20a) includes a generally hollow cylindrical drive trunnion body member 130' which carries in generally coaxially surrounding relationship thereto a drive ring gear 143 which is adapted to be drivingly engaged by a driven worm (not shown) in the conventional manner. A flange member 139 is rigidly affixed coaxially adjacent the axial end of member 38 as by weldments 42' and body 130' is in turn rigidly releasably affixed coaxially outwardly adjacent flange 139 as by a plurality of circumferentially spaced threaded fasteners 137. A circumferentially spaced plurality of suitably modified, elongated tube stub ends 60' extends axially within body 130' and through cooperably formed and aligned openings therein and in flange 139 to communicate with the exterior of body 130' adjacent the respective axial end portions 131 thereof thus providing plural, axially extending fluid flow passages corresponding to the hereinabove described passages 102. In this trunnion construction the stub tubes 60' may be welded in place but preferably are rigidly releasably affixed within body 130' by threaded fasteners 133 passing through a circumferential flange portion 135 of each tube 60' and into flange member 139 so as to be rigidly secured and conveniently removable. Other means such as suitably releasable clamp means (not shown) may be employed in lieu of fasteners 133 for securing stub tubes 60'.

Valve 24 comprises a unitary, formed body 144 which is rotatably secured coaxially adjacent the outer axial end of trunnion body 130 as by a spring bias retention assembly generally indicated at 146. Assembly 146 comprises an elongated bearing member 148 having a coaxial flange 150 adjacent one longitudinal end thereof whereby the member 148 is rigidly affixed coaxially with respect to body 130 as by plural threaded fasteners 153. A bearing shaft portion 154 of member 148 extends coaxially outwardly of flange 150 to slidably receive a cooperably formed bearing portion 156 of body 144. Preferably, a rotary bearing member 158, a bronze sleeve bearing for example, is disposed radially intermediate shaft 154 and bearing portion 156. The axially outer end of bearing portion 156 openly communicates with a retainer assembly housing portion 160 formed within body 144 such that a bolt 162 which is threadedly engaged coaxially within the outer end of bearing shaft 154 extends generally axially within housing portion 160. A retainer plate 164 is retained in coaxially surrounding relationship with bolt 162 with a radially outwardly extending flange portion 168 of plate 154 providing axial support for a spring bias means such as a helical spring 170 which is maintained in a state of mechanical compression intermediate plate 164 and an axially inwardly spaced end 172 of housing portion 160. Accordingly, spring 170 urges valve body 144 into biased engagement with trunnion body 130 for biased, relative rotary sliding engagement therebetween during relative rotation between shaft 20 and valve 24 as described hereinabove.

The flange portion 168 of plate 164 is freely rotatable with respect to a radially inner plate portion 169 as by means preferably including an anti-friction, axial thrust bearing 166 to permit relative rotation between plate portions 168, 169 with minimal wear. Thus, in operation, plate portion 169 rotates with bolt 162 as shaft 20 rotates while flange portion 168 is maintained rotationally stationary by biased engagement via spring 170 with the stationary housing 144.

Plural screws 171 secure a removable cover plate 176 coaxially adjacent the outer axial end of body 144 to close housing portion 160.

To preclude undue wear between the relatively rotating shaft 20 and valve 24, the rotary sliding interface therebetween comprises replaceable anti-abrasion wear members as follows. A generally disc-like wear member 178 is non-rotatably releasably affixed as by plural screws 180 adjacent the axially outer end of trunnion body 130 so as to present a flat wear face 182 for biased engagement by a wear face 183 of a cooperably formed wear member 184 which is releasably and non-rotatably secured coaxially adjacent the inner axial end of valve body 144 as by locater pins 186. Preferably, at least one of the wear plates, shown as the downstream plate 184, is formed for suitably resilient material. The other wear member 178 is of suitably compatible and durable material with a surface finish as required for low abrasion and friction to prolong the wear member life under the hereinabove described operating conditions. For example, plate 178 may be a steel plate with surface 182 machined to about a 64 micron finish. It is noted that members 178, 184 extend over substantially the entire axial end surface areas of trunnion and valve bodies 130, 144 radially outward of bearing 148 excepting only respective suitably formed apertures 190, 191 which register with ones of passages 102 and with selected interior portions of valve body 144, and which selectively register with each other during rotation of shaft 20 for fluid flow communication therebetween.

Inasmuch as the desired properties of plate 184 are low friction with steel plate 178 and high abrasion resistance, any of a variety of materials may be used for plate 184. In order to ensure low sliding friction with plate 178 any innately high lubricity material may be used, for example bronze or brass, or such materials of high density polyethylene or polyurethane. However, in order to additionally ensure long-wearing properties for plate 184 in the highly abrasive conditions (e.g. impingement of filtrate and residual particles therein on plate 184 during opening and closing of the ports 190, 191) a wear or abrasion resisting material is desirable. This excludes such materials as brass and bronze but includes such materials as the cited high density polyethylene, various plastics such as urethanes, also nylon, teflon, hard rubber, bakelite and various other materials of correspondingly favorable innate lubricity and high abrasion resistance. In addition, it is noted that since only the surface 183 of plate 184 need be formed from such a material, plate 184 may include such structural means as a steel skeleton 185 for overall structural integrity.

Adjacent the outer axial end of body 130, each passage 102 communicates selectively with an internally formed passageway means 106 in valve body 144 via selectively registered ones of apertures 190, 191 and passage 106 in turn communicates with the interior of conduit 26 whereby the hereinabove mentioned suction may be applied within respective ones of filter sectors 30 during selected cycle portions according to the relative rotary position of the shaft 20 with respect to valve 24. For example, fluid communication typically is maintained between passages 102, 106 at least when the respective sectors 30 are submerged in the slurry. The passages 102 and 106 may be provided with wear or abrasion resisting liners such as shown at 200, 201 similar to the hereinabove described liners 33 to provide improved wear characteristics for the respective flow passages.

If desired, when ones of passages 102 are isolated from the applied suction they may selectively communicate with other passageway means (not shown) formed within body 144 for such purposes as the admission of pressurized air thereinto for backblowing. Thus, it will be understood that the operating aspects of valve 24 are conventional as regards selective opening and closing of the described passages for application of suction, backblowing and the like.

According to the description hereinabove there is provided by the instant invention an improved rotary disc filter apparatus including an improved flow conducting means having anti-abrasion means for extended life and greater filter reliability. The invention furthermore provides for simplified maintenance and repair of such flow conducting means and other elements of a rotary disc filter.

Notwithstanding the description hereinabove of a particular preferred embodiment of the invention it will be appreciated that applicant's invention may be practiced in numerous alternative embodiments with various modifications thereto without departing from the broad spirit and scope thereof. For example, the materials employed for hub rings 44, wear member 184, and sector seals 72 among other elements, may be selected from a variety of suitable materials; tube assemblies 32 may have any suitable cross sectional shape and the particular design and arrangement of hub rings 44 and clamps 48 may be varied accordingly; the particular design of valve retention assembly 164 may be varied within a wide range of design latitude; and the like.

These and other embodiments and modifications having been envisioned and anticipated by the inventor, the invention should be interpreted as broadly as permitted by the scope of the claims appended hereto.

I claim:

1. In a rotary filter apparatus wherein a shaft portion including fluid flow passageway means is disposed in relative rotary relation with a valve means including fluid flow passageway means in a manner to permit selective fluid flow communication therebetween during such relative rotation, the improvement comprising: at least a pair of seal members including a first seal member releasably carried by such shaft portion and a second seal member releasably carried by such valve means; respective surface portions of said first and second seal members being maintained in continuously slideable face sealing engagement to define a sealed interface therebetween; and said first and second seal members including respective aperture means communicating between said sealed interface and the respective said passageway means in such shaft portion and such valve means to permit fluid flow communication therebetween across said sealed interface by selective registering of the respective said aperture means in said first and second seal members during relative rotation therebetween.

2. The improvement as claimed in claim 1 wherein said respective surface portions are formed from different materials.

3. The improvement as claimed in claim 2 wherein one of said materials exhibits the property of a higher innate lubricity than the other of said materials.

4. The improvement as claimed in claim 3 wherein said one material additionally exhibits the property of higher abrasion resistance than the other of said materials.

5. The improvement as claimed in claim 4 wherein said one material is from the group consisting of plastic urethanes, nylon, teflon, Bakelite, hard rubber and polyethylene.

6. The improvement as claimed in claim 4 wherein the one of said seal members having said surface portion formed of said one material is on the downstream side of said sealed interface with respect to the direction of fluid flow across said sealed interface.

* * * * *